Figure 1:
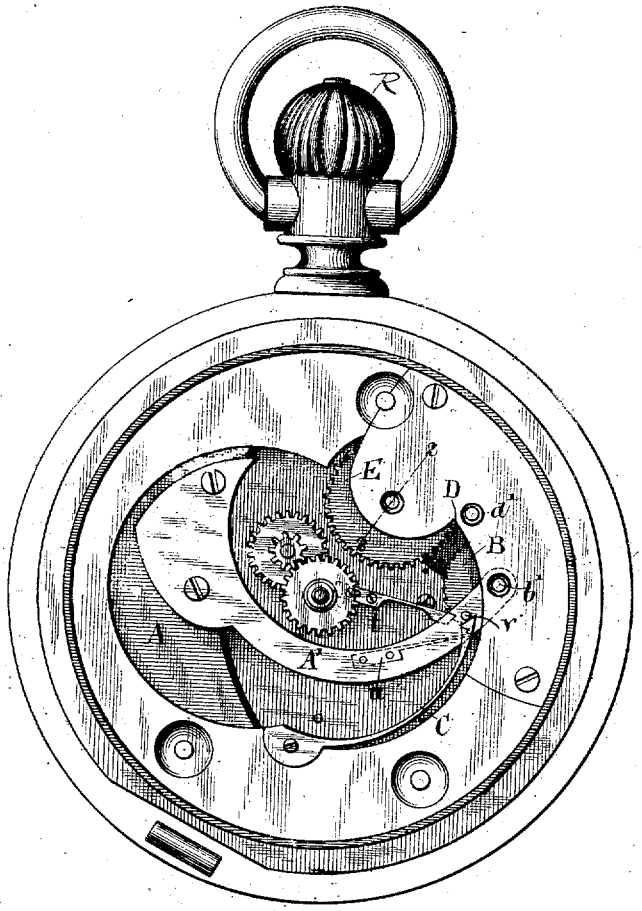

BEST AVAILABLE COPY

H. VON DER HEYDT,

Assignor to self and C. MULLER.

SELF WINDING WATCH.

No. 10,613.

Reissued June 16, 1885.

Witnesses:-

Louis M. Whitehead.

C. C. Poole

Inventor:-

Hermann von der Heydt by: Dyrenforth & Dyrenforth,

Attorneys:-

BEST AVAILABLE COPY

H. VON DER HEYDT,
Assignor to self and C. MULLER.

SELF WINDING WATCH.

No. 10,613. Reissued June 16, 1885.

Witnesses:-
Louis H. S. Whitehead.
C. C. Poole

Inventor:-
Hermann von der Heydt.
by: Dyrenforth & Dyrenforth,
Attorneys.

BEST AVAILABLE COPY

UNITED STATES PATENT OFFICE.

HERMANN VON DER HEYDT, OF CHICAGO, ILLINOIS, ASSIGNOR TO HIMSELF AND CARL MÜLLER, OF SAME PLACE.

SELF-WINDING WATCH.

SPECIFICATION forming part of Reissued Letters Patent No. 10,613, dated June 16, 1885.

Original No. 293,691, dated February 19, 1884. Application for reissue filed December 27, 1884.

*To all whom it may concern:*

Be it known that I, HERMANN VON DER HEYDT, a subject of the Emperor of Germany, and a resident of the city of Chicago, in the county of Cook and State of Illinois, have invented certain new and useful Improvements in Self-Winding Watches; and I do hereby declare that the following is a full, clear, and exact description thereof, reference being had to the accompanying drawings, and to the letters of reference marked thereon, which form part of this specification.

The idea of constructing watches made self-winding by means of the vibrations of a pendulum connected with the mainspring, the said vibrations being produced by the physical movements of the wearer in walking, originated with one Breguet, of Paris, France, at or about the beginning of the present century. Himself a man of extraordinary ability in the practice of his art, he was able to make self-winding watches of such perfect workmanship that, even at this time, various samples of his skill in this direction are in existence, and still continue, it is believed, to perform their functions satisfactorily. The principle upon which Breguet constructed his self-winding watch has met since with various attempts, more or less successful, at improvement. Of these the most recent attempt, so far as known, is due to one August von Loehr, of Vienna, Austria, to whom Letters Patent of the United States No. 211,280 were granted January 7, 1879. This device is objectionable from the fact that it cannot be sufficiently wound up unless worn by one who takes considerable bodily exercise. The patentee himself recognizes this fact in various articles written by him; but he regards it rather as an advantage than otherwise, not to the watch, however, but to its possessor, since, as he has stated, every one wearing a watch of his construction will be reminded of the evil of his ways by the failure of his time-piece to perform its duty by running down, so that it thereby becomes a monitor tending to reform the wearer of his inactive habits, thus promoting his general health. Whatever its advantages in conducing to the enjoyment of bodily health, it lacks an important feature to make it a practical and useful time-keeper for general use—viz., the adaptability of its mechanism to mainsprings other than those of the kind employed in the most delicate watches of the smallest size, and known to the trade in this country as the "lady's watch;" and it is further found, notwithstanding the assurance that owing to its peculiar construction the mainspring cannot be overwound, that such is not strictly correct, for there is a continual strain upon the spring after the latter has been wound to its full capacity, owing to the continuing action of the pendulum when the wearer exercises himself for a longer time than is required to fully wind the watch.

It is my object to overcome these objections; and my invention consists in certain mechanisms, hereinafter described, whereby a watch is made self-winding, and whereby, in order to be sufficiently wound up to go a whole day, the wearer will be required to walk only about fifteen minutes or perform movements of his body that will be equivalent to walking that length of time. At the same time the self-winding mechanism constituting a part of my invention is capable, by its application, of successfully operating the mainsprings of watches of all sizes; and to obviate any further winding of or strain upon the spring after it has been wound up to a desired extent, I have invented a suitable automatic mechanism.

My invention further consists in providing a self-winding mechanism whereby not only the coarsest mainspring used in watches may be wound by a minimum of vibrations of a pendulum, but which shall be so arranged that the space required for the works of an ordinary watch need not be increased to accommodate its parts; and it still further consists in certain additional features, details of construction, and combinations of parts, all as hereinafter more fully set forth.

In my invention the self-winding mechanism has but six parts additional to those of an ordinary key-winding watch, while the mechanism for protecting the mainspring from overwinding has but five, thus making a total of eleven additional parts.

Figure 2:
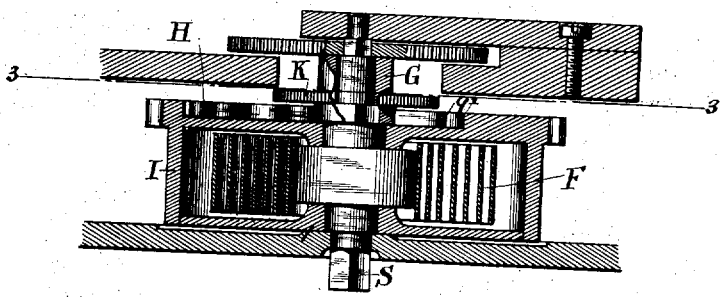

In the drawings, Figure 1 is a plan view of that part of my invention by which the self-winding is effected. Fig. 2 is a vertical sec-

Figure 3:
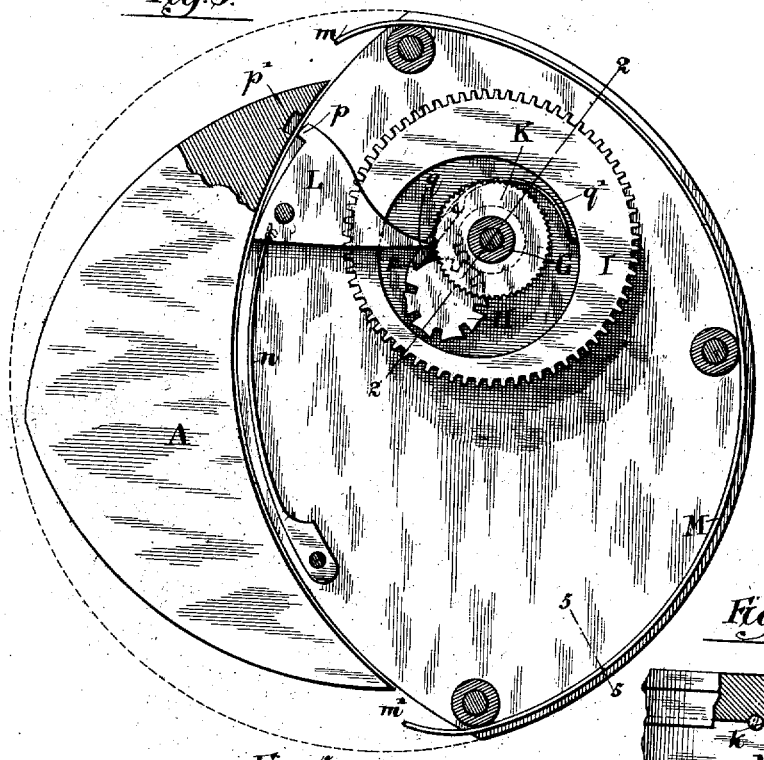
Figure 4:
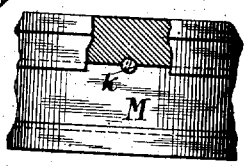
Figure 5:
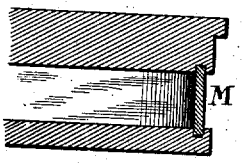

BEST AVAILABLE COP tion taken on the line 2 2 of Figs. 1 and 3. Fig. 3 is a horizontal section taken on the line 3 3 of Fig. 2, and showing the mechanism for relieving the mainspring from strain when it has been wound to a desired extent. Figs. 4 and 5 are detail views, the latter being a section taken on the line 5 5 of Fig. 3.

A is the pendulum, partly covered by the plate in Fig. 1 of the drawings, but fully shown in Fig. 3, in which the pendulum is shown as curved at its inner side concentrically with the pivotal axis of the pendulum, and as having its outer side formed by two circular curves of approximately the same radius as the inner wall of the watch-case, and so arranged that they fit closely to the adjacent parts of the said inner wall of the case at each limit of the vibration of the pendulum. By making the pendulum of the form described, I am enabled to use a heavier pendulum in a given space than would otherwise be possible, and in view of the improved result thus obtained the construction of the pendulum described is made the subject of a claim herein.

Secured at one end to the upper face of the pendulum A is the pendulum-rod A′, said pendulum-rod being located at the side of the watch adjacent to the dial and in the recess formed in the plate beneath the dial to afford space for the wheels and pinions by which the proper relative speed is given to the hour and minute hands, the said pendulum being curved, as shown, to avoid interference with said wheels and pinions.

The obvious advantage of the construction and location of the pendulum-rod, as described, is that no change in the proportions of the watch or increase in its thickness is rendered necessary to give room for the said rod. The pendulum-rod at its outer end is pivoted concentrically with the axis of the ratchet-wheel B by means of a pin passing through the hollow arbor of said wheel, and supported at each end in the watch-plate, so as to prevent the movements of the pendulum in any way influencing the movements of the said wheel.

C is a spring which engages with a pivot, *v*, inserted in the face of the rod A′ near its extremity, and the strength of which corresponds with the weight of the pendulum. This spring serves to keep the pendulum A in a vertical position, or approximately midway between the upper and lower limits of its vibratory movements, when the wearer is at rest, and to force it back into that position when caused to vibrate by the motion of the body.

On the inner side of the pendulum-rod A′ and firmly secured thereto at one end is a pawl, *u*, sufficiently stiff to prevent its bending when caused to operate, or by the counter-pressure of the ratchet-wheel B, and constructed to engage in the teeth of said ratchet-wheel. When by a motion or jar in walking the pendulum moves downwardly against the action of the spring C, the pawl *u* drives the ratchet-wheel part way round, where it is held by means of a pawl, *t*, acting as a detent, the latter being similarly placed and similar in construction to the pawl *u*. The ratchet-wheel B is provided with fine teeth, usually about one hundred in number. Its arbor is provided with a pinion having ten teeth to engage with the wheel D, having an arbor, *d′*, which has a pinion with eight teeth constructed to engage the wheel E, which has forty-eight teeth, and which operates the mainspring-arbor. Each vibration of the pendulum drives the ratchet-wheel B around through the medium of the pawl *u*, five of its teeth, and by the above arrangement of the wheels it will be seen that to cause a complete revolution of the ratchet-wheel will require twenty vibrations of the pendulum. These twenty vibrations will drive the wheel D by means of the pinion provided with ten teeth upon the ratchet-wheel arbor around five of its teeth, and, having in all fifty of such teeth, said wheel D will require five revolutions of the ratchet-wheel, or one hundred vibrations of the pendulum, to completely revolve it. The pinion of the arbor *d′*, with eight teeth, will with one revolution of the wheel D drive the wheel E, with forty-eight teeth, around eight of its teeth, and a complete revolution of the latter will require six revolutions of the wheel D, or six hundred vibrations of the pendulum.

The mainspring F is preferably of such length that it will require six and three-quarters revolutions of the mainspring-arbor to completely wind it up, and it is so arranged that one such revolution will cause the watch to run six and two-thirds hours. Six revolutions of the mainspring-arbor will therefore wind the watch sufficiently to go forty hours; and, if wound to its utmost capacity, it would go forty-five hours before running down. I prefer, however, to allow the last five hours of the spring's capacity to remain unutilized, to avoid possible strain thereon, and with that view have invented a means of checking the vibrations of the pendulum when the number six times six hundred or thirty-six hundred thereof has been reached, only allowing it again to vibrate when the watch has partially run down.

Thus far in the description of my self-winding device I have described the specific mechanism by means of which the purpose is preferably effected. It is obvious, however, that slight changes may be made in the positions and constructions of the different parts without departing from the spirit of my invention, and that likewise the number of teeth, &c., in the gear mechanism may be varied and still produce the desired results. I therefore do not confine myself to the above specific construction. The checking device above refered to forms an especially important feature of my invention, and a description thereof is as follows:

Referring to Figs. 2 and 3 of the drawings, G is a collar or cam-wheel secured upon the mainspring-arbor adjacent to the barrel I and provided with one tooth or cam-projection, and H is a notched wheel or disk which is pivoted upon the head of the said barrel in position for engagement with the collar G. As herein shown, both the collar G and wheel H are located in a recess in the head of the barrel. The object being to prevent further winding by the continued vibration of the pendulum after the arbor has made six revolutions, the notched wheel is provided with six spurs or projections and seven notches, one of which is engaged by the tooth upon the collar G at each revolution of the latter, so that the said wheel is rotated intermittently a distance of one tooth at each rotation of the arbor. A wheel, K, having a serrated or notched periphery is mounted to rotate freely upon the mainspring-arbor, said wheel being engaged with a point or projection upon a pivoted catch-click or detent, L, which is provided with a projection, *p*, adapted for engagement with the pendulum in such manner as to hold the latter from vibratory movement. The catch-click or detent L is held in position for the engagement of its point with the teeth or serrated edge of the wheel K by means of a spring, *n*, and the said wheel is caused to rotate with the barrel I as the latter turns in the running of the watch, by means of a yielding connection between the said wheel and the barrel, herein shown as in the form of a spring, *q'*, attached at one end to the wheel, and engaged at its opposite end with the side wall of the recess in the barrel-head, the detent being so arranged that the point thereof which is held in engagement with the wheel K is caused to slip over the teeth or serrations of said wheel in the rotation of the latter with the barrel in the manner above stated. Upon the wheel K is located a finger, *q*, (herein shown as made in one piece with the spring *q'* and pivoted to the said wheel,) said finger being located in position to engage a projection or tooth, *r*, upon the wheel H, the finger and tooth being so located that when the arbor has made six rotations in winding and the tooth upon the collar G has entered the last notch of the wheel H the tooth will encounter the finger *q*, thereby causing a partial backward rotation of the wheel K against the action of the spring *q'*, and a movement of the point of the catch-click L engaged therewith in a direction to cause the engagement of the projection *p* thereon with the pendulum. As soon as the movement of the arbor tending to wind the mainspring has stopped, the unwinding of the spring will obviously cause the rotation of the barrel and a bodily movement of the notched wheel H thereon in a direction to cause a backward-rotary movement of the said wheel H and the tooth *r* thereon, which is engaged with the finger *q*, until the spring *q'* has been permitted to rotate the wheel K a sufficient distance to cause the detent to release the pendulum, when the latter will again be free to vibrate.

As herein shown, the pendulum is provided with a recess, *p'*, adapted for engagement with the projection *p* upon the detent; but inasmuch as the projection upon the detent is caused to engage the pendulum through intermediate devices actuated by the pendulum itself, it will be observed that the projection cannot enter to any considerable distance into the notch. In practice, however, the said projection is carried forcibly against the inner face of the pendulum until by the frictional contact therewith the vibratory movement of the latter is stopped. If, however, while the projection is held in contact with the pendulum, the recess, by the slipping of the projection upon the pendulum, comes opposite the projection, the said projection will be caused to positively engage the recess by the slight springing of the metal composing the several parts of the winding and stop mechanisms.

As far as the operation of the devices above described in preventing the overwinding of the mainspring is concerned, the recess *p'* in the pendulum is obviously not essential, inasmuch as the end mentioned will in all cases be attained by the contact of the detent with the said pendulum. For the purpose of positively stopping the vibratory movement of the pendulum, the said recess will usually be found desirable, but for this purpose also the frictional contact of the detent with the pendulum may be found sufficient.

M is a thin metal band (shown in Figs. 3 and 4 and in section in Fig. 5 of the drawings) which passes part way round the circumference of the plates of the watch, and is extended at its ends into the chamber in which the pendulum A is located, so as to form springs *m m'*, adapted to be encountered by the pendulum at the upper and lower limits of the vibratory movements of the latter, and to thereby afford cushions to prevent the noise and jar which would otherwise be caused by the pendulum or the pendulum-rod striking against parts of the plates or the inner walls of the case, and also to accelerate the vibrations of the pendulum.

In the particular construction of the parts herein shown, the band is fitted at its edges in opposite grooves formed in the inner faces of the plates near the edges of the latter, a screw, *k*, (shown in Fig. 4 of the drawings,) being preferably inserted through the band as additional security against displacement of the latter.

Springs *m m'* may obviously be supported otherwise than by being made as part of a band, M, as herein shown. This construction is found advantageous, however, for the reason that the said band serves to close the space at the margin of the plates, so as to exclude dust from the works of the watch, as well as to form suitable springs or cushions attaching the said springs *m m'* to the plates.

Since it is not intended that my invention shall produce perpetual motion either in the watches to which it is applied, or necessitate it on the part of the wearers thereof, circum-

BEST AVAILABLE COP stances, may arise under which the pendulum will not be caused to vibrate and the watch would therefore be allowed to "run down," unless some other means were provided for winding it up and also for setting the hands. These requirements are met with a key, R, provided with a screw-thread to permit it to be screwed into the stem of the watch, suitably prepared to receive it. No claim is made herein to the said key, as it is intended that the latter shall form the subject of a separate application for patent.

The arrangement of my winding device, containing as it does but two extra wheels, B and D, admits the winding of the mainspring in the barrel without detriment to the winding mechanism. This would not be the case had there been more wheels employed, since the last one corresponding with the ratchet-wheel B would have had to make its revolutions, unless wound with painful slowness, with such rapidity as to have done it, and likely also its immediate neighbor, serious injury.

I claim as my invention—

1. In a self-winding watch, the combination, with a vibrating winding-pendulum, of a spring-actuated detent adapted to engage the pendulum, a notched or serrated wheel, as K, engaged with the detent, means connecting said wheel with the mainspring-barrel, whereby the wheel is caused to rotate with the barrel, and means actuated by the part of the watch mechanism which is moved in winding, constructed to rotate the said wheel relatively to the barrel when the watch is wound to a desired extent, whereby the detent will be caused to engage the pendulum, substantially as described.

2. In a self-winding watch, the combination, with the vibrating winding-pendulum, of a pivoted detent constructed to engage the pendulum, a notched or serrated wheel, K, mounted concentrically with the mainspring-arbor, and engaged with the said detent, a spring, *n*, applied to hold the detent in position for engagement with the wheel K, a yielding connection between the barrel and wheel K for causing the rotation of the said wheel with the barrel, and means for causing a partial backward rotation of the said wheel K when the watch is wound to a desired extent, whereby the detent is caused to engage the pendulum, substantially as and for the purpose set forth.

3. In a self-winding watch, the combination, with the pendulum A, of mechanism for preventing overwinding of the mainspring, comprising a pivoted detent adapted to engage the pendulum, a wheel, K, mounted upon the mainspring-arbor, a cam-wheel, G, upon the said arbor, a notched wheel, H, mounted upon the barrel and provided with a tooth or projection *r*, a spring, *q'*, connecting the barrel with the wheel K, and a finger, *q*, attached to the wheel K, and adapted for engagement with the tooth *r* of the said wheel H, substantially as and for the purpose set forth.

4. In a self-winding watch, in combination with the pendulum A, mechanism to prevent overwinding of the mainspring, said mechanism consisting of a cam-wheel, G, on the barrel containing the mainspring, intermittent wheel H, having a tooth, *r*, to press against the finger *q*, the latter being pivoted to the wheel K, and having a continuation to form a spring, *q'*, to force the wheel K around in the direction of the revolving barrel when the mainspring is unwinding, and catch-click L, engaging at its point with the teeth of the wheel K, and held in position by means of the spring *n*, and provided with a projection, *p*, to fit into a recess, *p'*, in the pendulum, substantially as described, and for the purpose set forth.

5. In a self-winding watch, the band M, fitting within recesses, one on each inner face of the two plates of a watch, and formed near the edges of the said plates, and having its ends projecting into the pendulum-chamber to allow the pendulum to strike against them in its vibrations, thus preventing noise and operating to accelerate the vibrations of the said pendulum, substantially as described.

In testimony that I claim the foregoing as my invention I affix my signature in presence of two witnesses.

HERMANN VON DER HEYDT.

Witnesses:

C. CLARENCE POOLE,

OLIVER E. PAGIN.